United States Patent [19]

Harris et al.

[11] Patent Number: 4,636,422
[45] Date of Patent: Jan. 13, 1987

[54] COMPOSITE FIBER REINFORCED MOLDED STRUCTURE FOR DIMPLE CONTROL

[75] Inventors: Charles E. Harris, Bellevue, Wash.; Robert K. Tolley, Benton, Kans.

[73] Assignee: The Boeing Company, Seattle, Wash.

[21] Appl. No.: 759,154

[22] Filed: Jul. 26, 1985

[51] Int. Cl.$^4$ .......................... B32B 5/16; B32B 1/04
[52] U.S. Cl. .................................... 428/174; 264/241;
    264/257; 428/246; 428/251; 428/252; 428/286;
    428/293; 428/902
[58] Field of Search ................ 428/174, 156, 293, 284,
    428/902, 167, 246, 251, 252, 297, 298; 264/241,
    257, 324, 112

[56] References Cited

U.S. PATENT DOCUMENTS

| | | | |
|---|---|---|---|
| 3,313,674 | 4/1967 | Mathews | 428/246 |
| 4,044,188 | 8/1977 | Segal | 428/293 |
| 4,086,378 | 4/1978 | Kam et al. | 428/36 |
| 4,098,943 | 7/1978 | Degginger et al. | 428/298 |
| 4,269,884 | 5/1981 | Della Vecchia et al. | 428/156 |
| 4,451,528 | 5/1984 | Krause | 428/298 |
| 4,478,771 | 10/1984 | Schreiber | 264/22 |

Primary Examiner—Paul J. Thibodeau

[57] ABSTRACT

A composite fiber reinforced molded structure having a buried precured fabric therein. The precured fabric preventing dimpling when integrally forming a reinforcing member.

3 Claims, 4 Drawing Figures

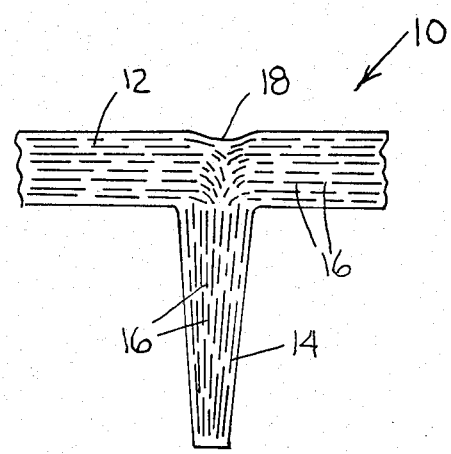
Fig.1 PriorArt
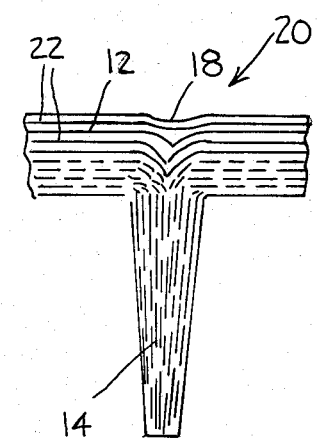
Fig.2 PriorArt
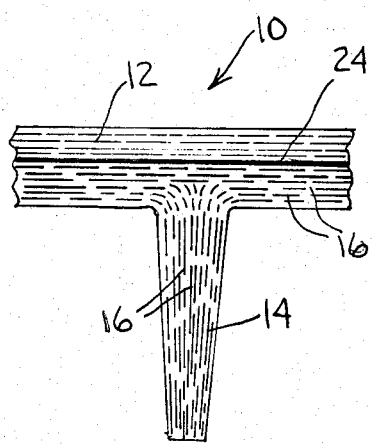
Fig.3
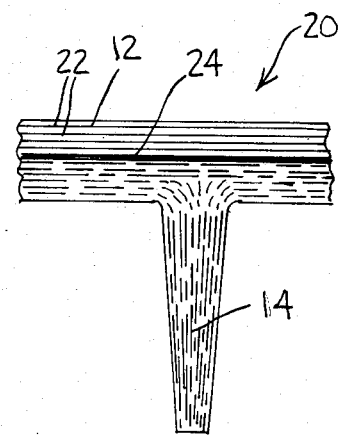
Fig.4

COMPOSITE FIBER REINFORCED MOLDED STRUCTURE FOR DIMPLE CONTROL

BACKGROUND OF THE INVENTION

This invention relates to a composite fiber reinforced molded structure and more particularly but not by way of limitation to a molded structure containing integrally molded ribs, spars and stiffening members. The outside surface of the structure having a buried precured fabric sheet to control dimpling of the outside member into the ribs, spars and stiffening members.

Heretofore, there have been various types of reinforced compression molded composite structures containing integrally molded ribs, spars and stiffening members. These structures have all had reduced strength in the outside member as a result of surface dimpling into the integrally formed member as a result of the material flowing during the molding process and shrinking of the material during cooling and curing. None of these structures have had a precured, buried sheet of material for controlling dimpling.

In the following United States Patents: U.S. Pat. No. 4,086,378 to Kam et al; U.S. Pat. No. 4,201,612 to Figge et al; U.S. Pat. No. 4,388,263 to Prunty; U.S. Pat. No. 4,401,841 to Meyer et al; U.S. Pat. No. 4,435,349 to Dominquez et al; U.S. Pat. No. 4,436,781 to Rother et al; U.S. Pat. No. 4,460,531 to Harris et al and U.S. Pat. No. 4,478,771 to Schreiber various types of methods of manufacturing fiber reinforced articles are shown. None of these articles or methods of making composite material particularly point out the unique features and advantages of the subject invention.

SUMMARY OF THE INVENTION

The subject composite fiber reinforced molded structure prevents and controls dimpling into an integrally formed molded rib, spar, stiffening member and the like.

The subject molded structure includes one or more sheets of precured fabric providing a buried rigid membrane to prevent the dimpling of the outside surface of the structure into an internal stiffener or reinforcing member.

The subject composite fiber reinforced molded structure includes an outside member of chopped fiber strands or uncured fabric and having a layer or sheet of precured fabric buried therein. An internal member is integrally formed and extends outwardly from the outside member for stiffening or reinforcing the outside member.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates the use of chopped fiber strands in a prior art structure which dimple into a stiffening or reinforcing member during the molding and shrinking of the structure.

FIG. 2 illustrates how external sheets of woven fabric or unidirectional fibers in a prior art structure dimple into the stiffening member.

FIG. 3 illustrates the subject invention with a buried layer of precured fabric to prevent dimpling with chopped fiber material.

FIG. 4 illustrates the subject invention with a buried layer of precured fabric to prevent dimpling with woven fabric or unidirectional fibers.

DETAILED DESCRIPTION OF THE DRAWINGS

In FIG. 1 a prior art composite fiber reinforced molded structure is illustrated and designated by general reference numeral 10. The structure 10 includes an outside member 12 and an integrally formed internal stiffener or reinforcing member 14 molded from the outside member 12 and extending outwardly therefrom. The outside member 12 and stiffener 14 are made of chopped fiber strands 16 which, when during the molding, shrinking or curing of the structure 10, cause a dimple 18 to be formed therein thereby greatly reducing the strength of the structure 10.

In FIG. 2 a similar prior art fiber reinforced molded structure is illustrated made up of sheets of woven fabric 22 or unidirectional fibers making up the outside member 12 with the integrally formed internal stiffener or reinforcing member 14. Again, during the molding, shrinking and curing of the structure 20, the dimple 18 is formed thereby greatly reducing the strength of the outside member 12 and the structure 20.

In FIG. 3 a layer 24 of precured fabric is shown buried in the outside member 12 of structure 10 to prevent the dimple 18 as shown in FIGS. 1 and 2. By providing the buried layer 24 in the outside member 12, the chopped fiber material 16 is prevented from dimpling into the internal stiffener 14.

In FIG. 4 the same precured fabric 24 is buried inside the outside member 12 of structure 20 to prevent the additional layers of uncured fabric 22 or unidirectional fibers from dimpling into the internal stiffener 14.

The material chosen for structures 10 and 20 is of a fiber such as fiberglass strands, Kevlar, graphite or any other types of high strength fiber to provide strength with polyester vinylester, vinylurathane or any other types of resin suitable for compression molding. External sheets of the reinforcing material is woven into fabric and unidirectional continuous fiber sheets can be included for additional strength. One or more sheets of the precured fabric 24 are included as a buried, rigid membrane to prevent the dimpling of the outside member 12 into the internal stiffeners 14 or reinforcing member.

Changes may be made in the construction and arrangement of the parts or elements of the embodiments as described herein without departing from the spirit or scope of the invention defined in the following claims.

What is claimed is:

1. A composite fiber-reinforced molded structure, the structure comprising:
   an outside member of fabric embedded in an uncured resin, said outside member further including a precured, resin-impregnated fabric embedded therein, both aid fabrics including high modulus, high strength fibers; and
   an internal stiffener integrally formed with said outside member and extending outwardly therefrom, said stiffener including high modulus, high strength fibers embedded in an uncured resin.

2. A composite fiber-reinforced molded structure, the structure comprising:
   an outside member of chopped fiber strands embedded in an uncured resin, said outside member further including a pre-cured, resin-impregnated fabric embedded therein, said fabric including and said strands being high modulus, high strength fibers; and an internal stiffener integrally formed with said outside member and extending outwardly therefrom, said stiffener including high modulus, high strength chopped fibers embedded in an uncured resin.

3. A composite fiber-reinforced molded structure, the structure comprising:

an outside member of fabric sheets and unidirectional fibers embedded in an uncured resin, said outside member further including a pre-cured, resin-impregnated fabric sheet embedded therein, both said fabric sheets including high modulus, high strength fibers, and said unidirectional fibers being high modulus, high strength fibers; and an internal stiffener integrally formed with said outside member and extending outwardly therefrom, said stiffener including high modulus, high strength fibers embedded in an uncured resin.

* * * * *